Sept. 1, 1925.

H. M. SCHMITZ

SPRING

Filed Oct. 20, 1924

1,552,084

Inventor
Henry M. Schmitz

Patented Sept. 1, 1925.

1,552,084

UNITED STATES PATENT OFFICE.

HENRY M. SCHMITZ, OF MILWAUKEE, WISCONSIN.

SPRING.

Application filed October 20, 1924. Serial No. 744,783.

*To all whom it may concern:*

Be it known that I, HENRY M. SCHMITZ, a citizen of the United States, and resident of Milwaukee, in the county of Milwaukee and State of Wisconsin, have invented certain new and useful Improvements in Springs; and I do hereby declare that the following is a full, clear, and exact description thereof.

This invention relates to springs.

Objects on this invention are to provide a spring which may be formed in the manner of a composite leaf spring, which will lubricate itself and insure proper lubrication between each of the several underlying leaves of the composite spring, which has a greater strength for the same weight of material than springs heretofore constructed, and which is so designed that it may be readily produced.

Although this spring may be employed in a wide variety of places, it is particularly applicable for use in automobile construction, and is so constructed that the center aperture for the retaining bolt is avoided and thus an increase of strength and freedom from crystallization is secured.

A further object is to provide a spring in which the main leaf is so constructed that it will retain the lubricant and conduct it to the desired places without any leakage, and more specifically to provide a main leaf which is formed from a tubular member.

An embodiment of this invention is shown in the accompanying drawings, in which:—

Referring in detail to the drawings, it will be seen that the spring is a composite leaf spring and comprises a main leaf 1 having rolled eyelets 2 at its outer ends, and that a plurality of auxiliary springs 3 are positioned in contact with said main spring in the usual manner.

Figure 4:
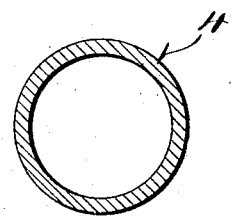
Figure 4 is a sectional view of the tube from which the main leaf is formed.

In forming the main leaf of this spring a tubular member, such as indicated at 4 in Figure 4, is employed. This tubular member is flattened so as to provide completely flattened side members 5, and a centrally located rib 6. This centrally formed rib 6 extends from adjacent the ends of the spring towards the center and is interrupted at the center to provide a space 7 for the reception of a clip of any desired character, whereby the central portion of the spring may be secured in position, thus avoiding the usual bolt hole with the consequent weakening and crystallization of the central portion of the spring, as frequently occurs in the usual types of springs.

Figure 1:
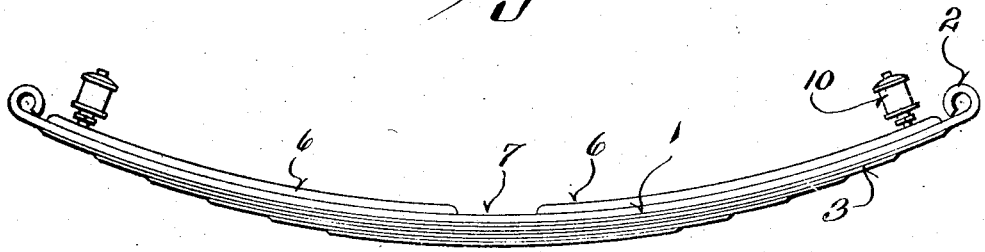
Figure 1 shows the complete spring.
Figure 2:
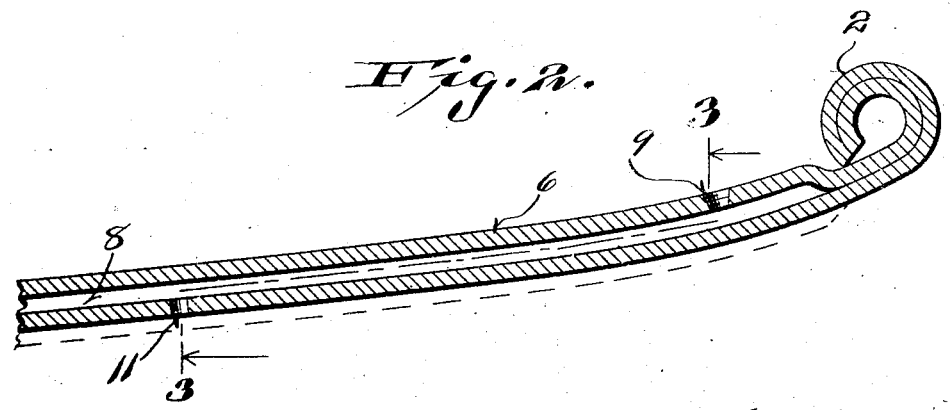
Figure 2 is an enlarged vertical sectional view through a portion of the spring showing the main leaf in section.
Figure 3:
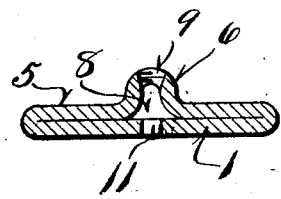
Figure 3 is a transverse section on the line 3—3 of Figure 2.

It will be noted from Figure 2 that the ends of the main leaf 1 are completely flattened and are rolled into eyelet form, as indicated at 2. Further, from Figures 2 and 3, it will be seen that the central rib 6 provides a channel or oil passage 8 within the main body of the leaf. This central passage is not of the nature of a groove but is in reality a passage located within the actual body portion of the main leaf 1. The sections of the ribs 6 are each provided with threaded apertures 9 on their upper sides adapted to receive the thread stems of the oil cups 10, as shown in Figures 1 and 2. Further, the bottom face or contacting face of the main leaf 1 is provided with a plurality of apertures 11 which are adapted to discharge oil and consequently keep the bearing faces well lubricated. Obviously, the auxiliary springs may also be provided with apertures to permit the oil to freely flow to other portions of the composite springs, if desired, otherwise the oil will be discharged, as stated, through the apertures 11 and will find its way over the sides of the auxiliary springs and will enter between their marginal edges.

It is to be noted that the ribs 6 serve the three fold purpose of providing oil passages within the body of the main leaf, of providing ribs between which the securing central clips may be most easily retained and further of providing an increased strength of main leaf due to the cross sectional contour thereof.

It will thus be seen that a leaf spring construction has been provided which may be easily formed, which is cheap to manufacture, and which is highly efficient in maintaining lubrication.

Although the invention has been described in considerable detail, it is to be understood that the invention may be variously embodied and is, therefore, to be limited only as claimed.

I claim:

1. A composite leaf spring comprising a plurality of leaves, one leaf having a tubular formation with an internal oil carrying channel and having apertures for the distribution of oil.

2. A composite leaf spring comprising a main leaf and a plurality of auxiliary leaves, said main leaf being of flattened tubular construction and having a channel located internally therein and having oil discharge apertures opening into said channel.

3. A composite leaf spring comprising a main leaf and an auxiliary leaf, said main leaf having an oil passage formed through its body and completely closed through its major extent and having oil discharge apertures communicating with said passage.

4. A leaf spring comprising a main leaf and a plurality of auxiliary leaves, said main leaf being a flattened tube having an outwardly pressed rib on one side forming an internal oil channel, and having oil discharge apertures communicating with said oil channel.

5. A composite leaf spring comprising a main leaf and a plurality of auxiliary leaves, said main leaf consisting of a flattened tube having two centrally located, outwardly pressed ribs on one side and extending from opposite ends towards the center and having their inner juxtaposed ends spaced apart, the other side of said leaf being flat through its extent and contacting with the next adjacent leaf of the composite leaf spring, said ribs forming an internal channel in said main leaf and said main leaf having apertures opening into said channel.

6. A leaf spring comprising a main leaf and a plurality of auxiliary leaves, said main leaf consisting of a flattened tube having a pair of centrally located ribs extending from opposite ends and spaced apart at the center, said ribs forming internal oil channels in the main leaf, and said main leaf having a plurality of apertures opening into said channel.

7. A leaf spring comprising a main leaf formed of a tube and having flattened sides and a central rib, said rib being interrupted at the center of said leaf and having oil cup receiving apertures at its outer ends, said ribs forming oil channels and said leaf having oil discharge apertures communicating with said channels, and a plurality of auxiliary leaves cooperating with said main leaf.

In testimony that I claim the foregoing I have hereunto set my hand at Milwaukee, in the county of Milwaukee and State of Wisconsin.

HENRY M. SCHMITZ.